United States Patent
Tucker et al.

[19]

[11] Patent Number: 5,890,524
[45] Date of Patent: Apr. 6, 1999

[54] ROUTER TABLE SLED

[75] Inventors: Edwin C. Tucker, Ottawa; Steve K. Jones; Lloyd Sevack, both of Nepean, all of Canada

[73] Assignee: Lee Valley Tools Ltd., Ottawa, Canada

[21] Appl. No.: 139,419

[22] Filed: Aug. 25, 1998

[51] Int. Cl.⁶ .......................... B27B 31/00; B27B 27/00; B27H 1/02

[52] U.S. Cl. .............................. 144/371; 33/403; 33/430; 33/465; 33/197; 83/468.7; 83/468.1; 83/409; 144/253.1; 144/135.2; 144/87; 144/253.2; 269/303; 269/315

[58] Field of Search .............................. 33/197, 403, 430, 33/465, 501.06, 811, 569; 83/435.1, 435.12, 467.1, 468.2, 468.7; 144/84, 85, 89, 90.1, 135.2, 253.1, 253.2, 286.1, 371; 269/303, 315

[56] References Cited

U.S. PATENT DOCUMENTS 5,016,358  5/1991  Rice et al. ................................. 33/430
5,195,730  3/1993  Taylor ..................................... 269/303
5,553,644  9/1996  Adams ................................... 144/253.2
5,768,966  6/1998  Duginske ............................... 83/468.7
5,779,467  7/1998  Tucker et al. ............................ 144/253

*Primary Examiner*—W. Donald Bray
*Attorney, Agent, or Firm*—John S. Pratt; Kilpatrick Stockton LLP

[57] ABSTRACT

A router table sled for use with a router table and a router table fence includes an arm assembly that rides along the fence and a strut assembly that supports the workpiece. The arm assembly includes a slider that slides along an upper edge of the fence and an arm attached to an upper edge of the slide. The arm is usually in a position perpendicular to the slide. The arm is also coupled to a strut assembly that includes a main strut, and two additional struts located beneath the main strut. Each strut includes a longitudinally-centered T-shaped slot formed into top, front, and rear faces. The front faces of each strut lie substantially within the same plane. The two lower struts have opposing edges that are spaced a predetermined distance from each other. When a workpiece is clamped to the faces of the struts, an edge may be placed against the fence. The workpiece may then be moved across the router bit to produce a square cut.

26 Claims, 5 Drawing Sheets

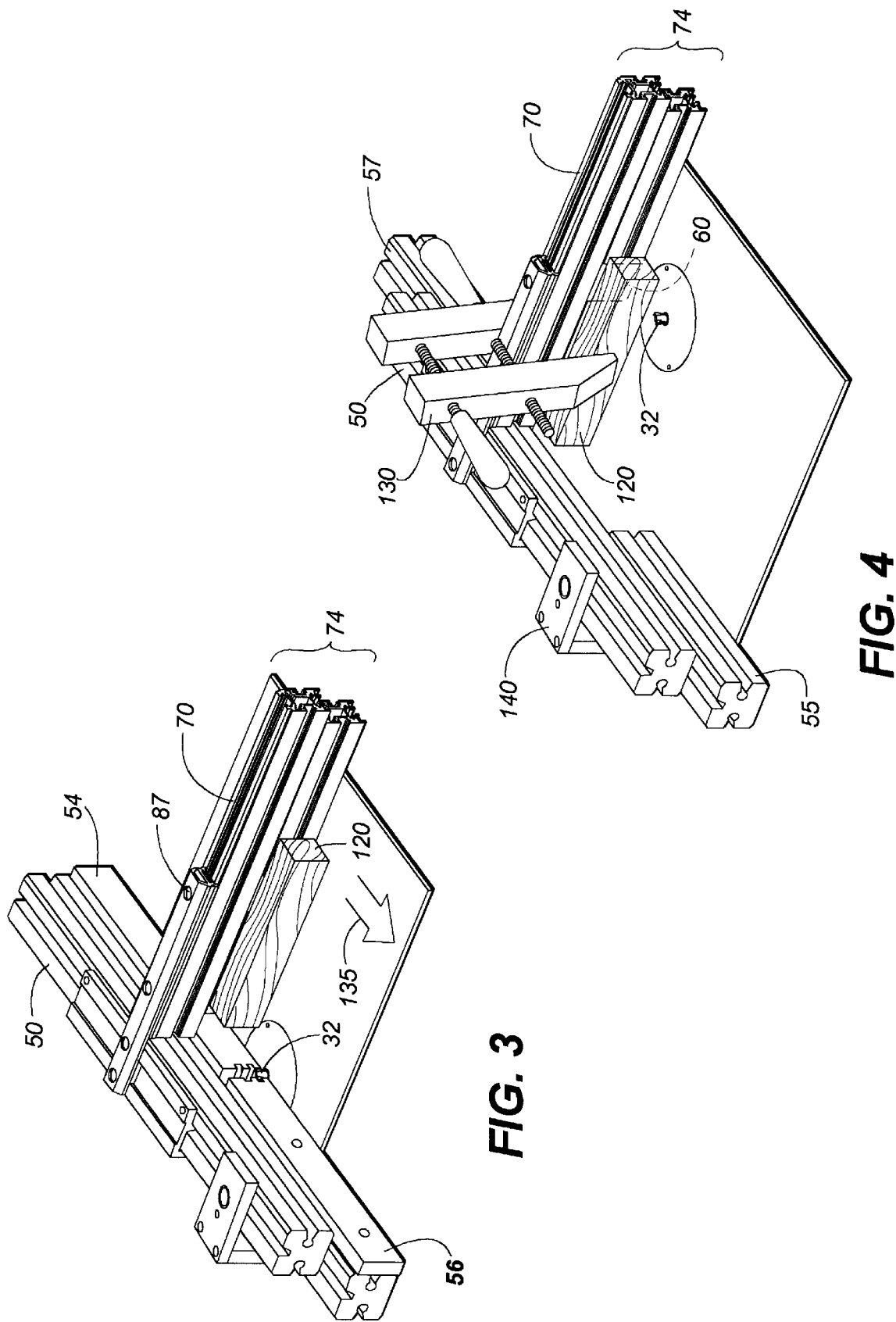

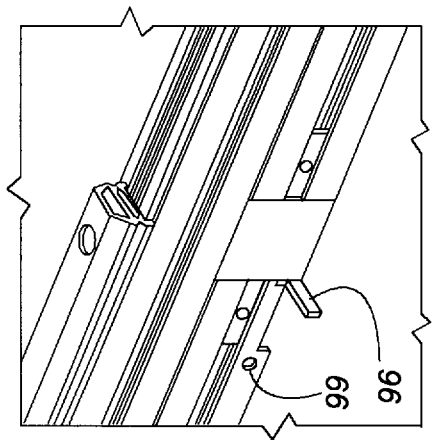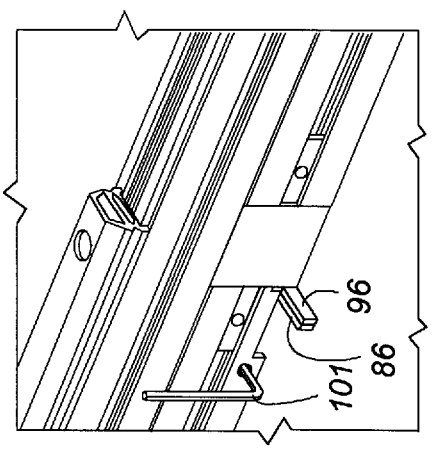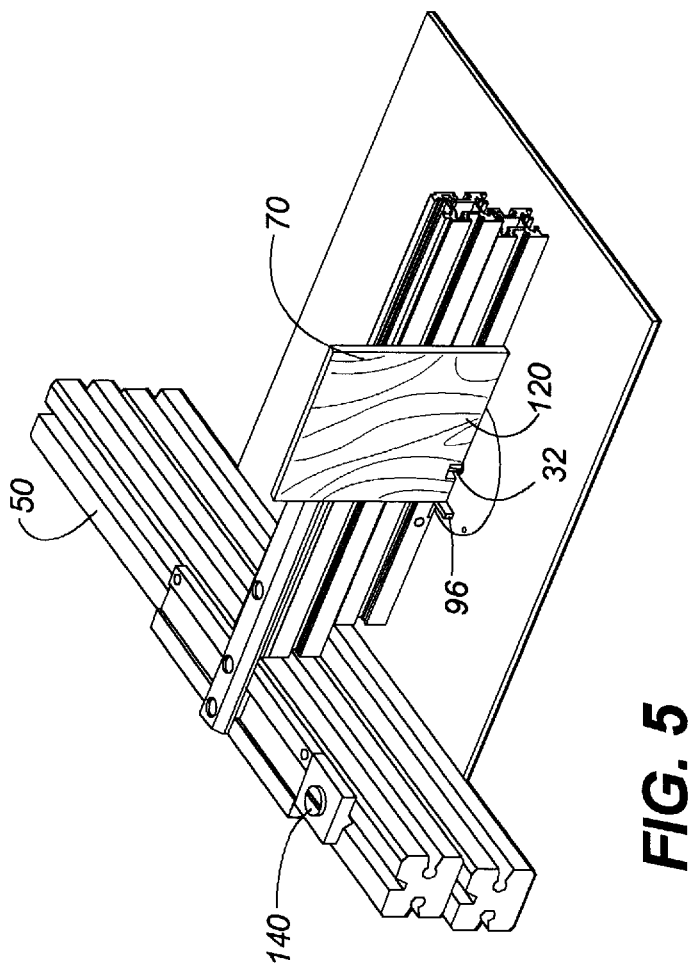

ROUTER TABLE SLED

BACKGROUND OF THE INVENTION

1. Field of the Invention

The present invention is directed to woodworking accessories and, more particularly, to a sled for use with a router table.

2. Background

The electric router is one of the most versatile woodworking tools available. The router was originally designed as a "hand shaper" for cutting moldings and profiles. With a modest selection of cutters, it may also be used for shaping, joint-making, duplicating, and trimming.

Many fixtures will hold a router stationary. Their design depends on where the operator wants to hold the tool in relation to the workpiece. An overarm router, for example, holds the router above the work. This is useful for certain pattern-routing operations. A joint maker typically holds the router beside the work to make joinery cuts. The most versatile stationary routing jig, however, is a router table, which holds the router below the work.

On most router tables, the router is attached to a mounting plate, made from thin plastic or metal. This plate is mounted flush with the surface of the table, suspending the router upside down below it. A design that is superior to in many respects uses a stiff steel table, as described in U.S. Pat. No. 5,715,880, for a "Router Table Top", which is incorporated by reference herein. To use a table-mounted router, the workpiece is typically guided along a fence as it passes over the bit. A router table fence is described in detail in U.S. Pat. No. 5,779,407 for a "Router Table Fence System", which is incorporated by reference herein.

In combination, the router, router table, and fence facilitate the creation of numerous types of woodworking patterns and joints. Edge treatments such as roundovers, chamfers, and ogees may be easily created using the proper router bit. Moreover, complex decorative joints, such as dovetail joints may be routed on a router table using dovetail bits. Rabbets and grooves may be formed with safety and control. The router/router table/fence combination may even be used for less conventional purposes, such as jointing an edge of a warped board.

Nevertheless, certain operations are difficult to perform using only a router table and a fence. Routing the end of a workpiece, for instance, is difficult and can be unsafe because only a small surface area of the piece contacts the fence and the user's fingers pass dangerously close to the high-velocity bit. Finally, finger joints-regularly spaced cuts along the width of a workpiece-cannot be easily cut with the router/router table/fence combination alone. Instead, such joints often must be created using a table saw or additional router table jigs or accessories.

SUMMARY OF THE INVENTION

This invention overcomes the problems and disadvantages of the prior art by facilitating certain router table operations, such as end routing and the creation of finger joints. This is accomplished with the present invention which is directed to a router table sled for use with a router table and a fence. The sled moves parallel to the fence and provides an additional surface for supporting and controlling a workpiece, enabling certain routing procedures that may not be performed safely with a fence, alone.

The sled includes an arm assembly that engages an upper edge of the router table fence. The arm assembly includes a slide portion that glides along the fence upper edge and an arm that extends orthogonally from the slide. A strut assembly is attached beneath the arm assembly. The strut assembly includes a fixed top strut coupled to the arm and two movable struts-a clamp strut and a lower strut-attached beneath the top strut. The two movable struts have opposing ends that may be abutting or spaced a fixed distance away from each other. Two members can protrude from the front face of the clamp strut: (1) a fixed key; and (2) a sliding key. The sliding key may be moved relative to the fixed key during the creation of finger joints.

The end of a workpiece may be machined by placing it flush against the front faces of the strut assembly with an edge lying flush against the fence. The fence includes an opening that accommodates a router bit protruding from the router table top. The workpiece may be end routed by clamping the workpiece to the sled and pushing the workpiece edge across the router bit using the sled and the fence as alignment aids. This procedure is far more accurate and safer than using the fence alone.

Finger joints may be easily created by using the fixed key alone or together with the sliding key. To create finger joints, the user moves the lower strut and the clamp strut a fixed distance apart to allow the router bit to protrude between the two struts. A workpiece is placed against the fixed key and passed over the router bit to create the first finger opening. The first finger opening is then placed over the fixed key and passed over the router bit again to create the second finger opening. This procedure is repeated until all of the needed finger openings have been created.

In accordance with the purpose of the invention, as embodied and broadly described herein, the invention is a router table sled for use with a router table fence and a router table top, the sled comprising: a slide having a groove that slidably engages an upper face of the router table fence; an arm rigidly coupled to an upper edge of the slide; and a strut assembly slidably engaging a lower edge of the arm.

Accordingly, it is an object of the present invention to provide a router table sled that enables a table-mounted router to be used more safely makes table routing safer.

It is an additional object of the present invention to provide a router table sled that is simple to use.

It is a further object of the present invention to provide a router table sled that facilitates end routing.

It is yet another object of the present invention to provide a router table sled that facilitates the creation of finger joints.

Additional objects and advantages of the invention will be set forth in part in the description which follows and in part will be obvious from the description or may be learned by practice of the invention. The objects and advantages of the invention will be realized and attained by means of the elements and combinations particularly pointed out in the appended claims.

BRIEF DESCRIPTION OF THE DRAWINGS

FIG. 3 is a perspective view of the sled of the present invention when set up for end routing a workpiece.

FIG. 4 illustrates the set-up for cross-routing using the sled of the present invention.

FIG. 5 is an illustration of the sled of the present invention when set up for creating finger joints.

FIG. 6 is a close-up view of the sliding and fixed keys of the sled of the present invention.

DETAILED DESCRIPTION

Reference will now be made in detail to a preferred embodiment of the invention, examples of which are illustrated in the accompanying drawings. Wherever possible, the same reference numbers will be used throughout the drawings to refer to the same or like parts.

Figure 1:
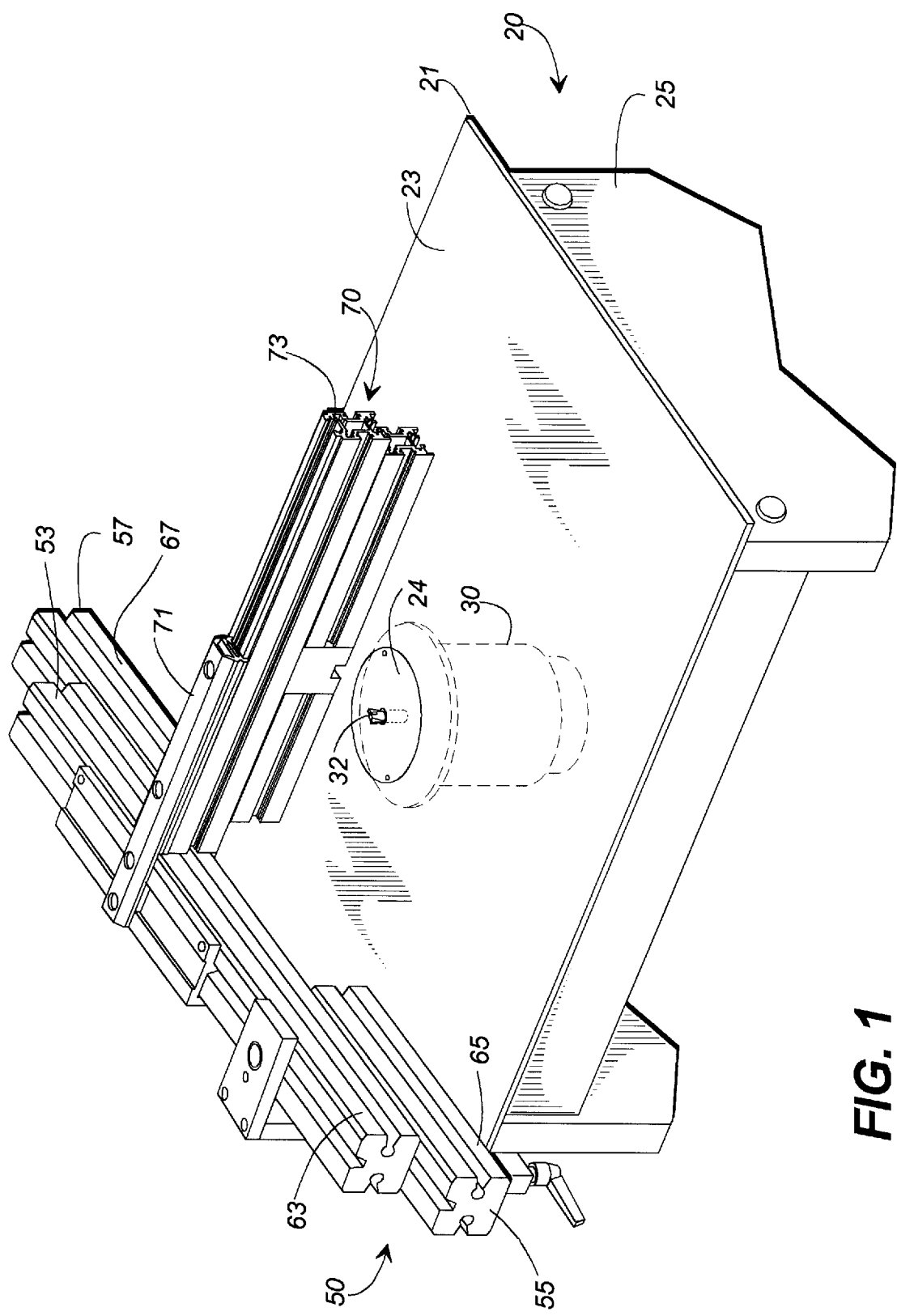
FIG. 1 is a front perspective view of a router table sled coupled to a router table fence, according to a preferred embodiment of the present invention.

FIG. 1 is a front perspective view of a router table sled 70 coupled to a router table fence 50, according to a preferred embodiment of the present invention. The router table sled 70 and router table fence 50 are mounted on an upper surface 23 of a tabletop 21 of a router table 20. The router table 20 may be constructed according to one of a number of known router table construction methods, including the method described in U.S. Pat. No. 5,715,880, for a "Router Table Top". The router table 20 includes a base unit 25 and the tabletop 21. The tabletop 21 is coupled to an upper portion of the base unit 25. A plunge or fixed base router 30, is attached to the underside of a router table 23 using a router table insert 24. A bit opening within the insert 24 permits passage of a router bit 32 therethrough.

The router table fence 50 may be constructed according to one of a number of known methods for manufacturing router table fences, including the method described in U.S. Pat. No. 5,779,407, which is incorporated by reference herein. The fence 50 includes a top spar 53 connected to two bottom spars 55, 57 by screws. The top spar 53 includes a front face 63 that lies in substantially the same plane as front face 65, 67 of the bottom spars. The bottom spars 55, 57 may be either abutting or separated by a predetermined distance. The fence 50 is mounted on the upper surface 23 of the tabletop 21 by one or more clamps. Although the fence is illustrated as lying at an edge of the tabletop 21, the fence may also be attached to the tabletop 21 such that the router bit 32 lies between the bottom spars 55, 57.

The router table sled 70 is coupled to the router table fence 50 by an arm assembly 71 that slides along top spar 53. A lower edge of the arm assembly 71 slidably engages an upper face of a main strut 73 that, itself, is positioned above and engages a clamp strut 75 and a lower strut 77. The arm assembly 71 is a T-shaped structure that allows struts 73, 75, 77, and a workpiece to slide orthogonally against fence 50.

Figure 2:
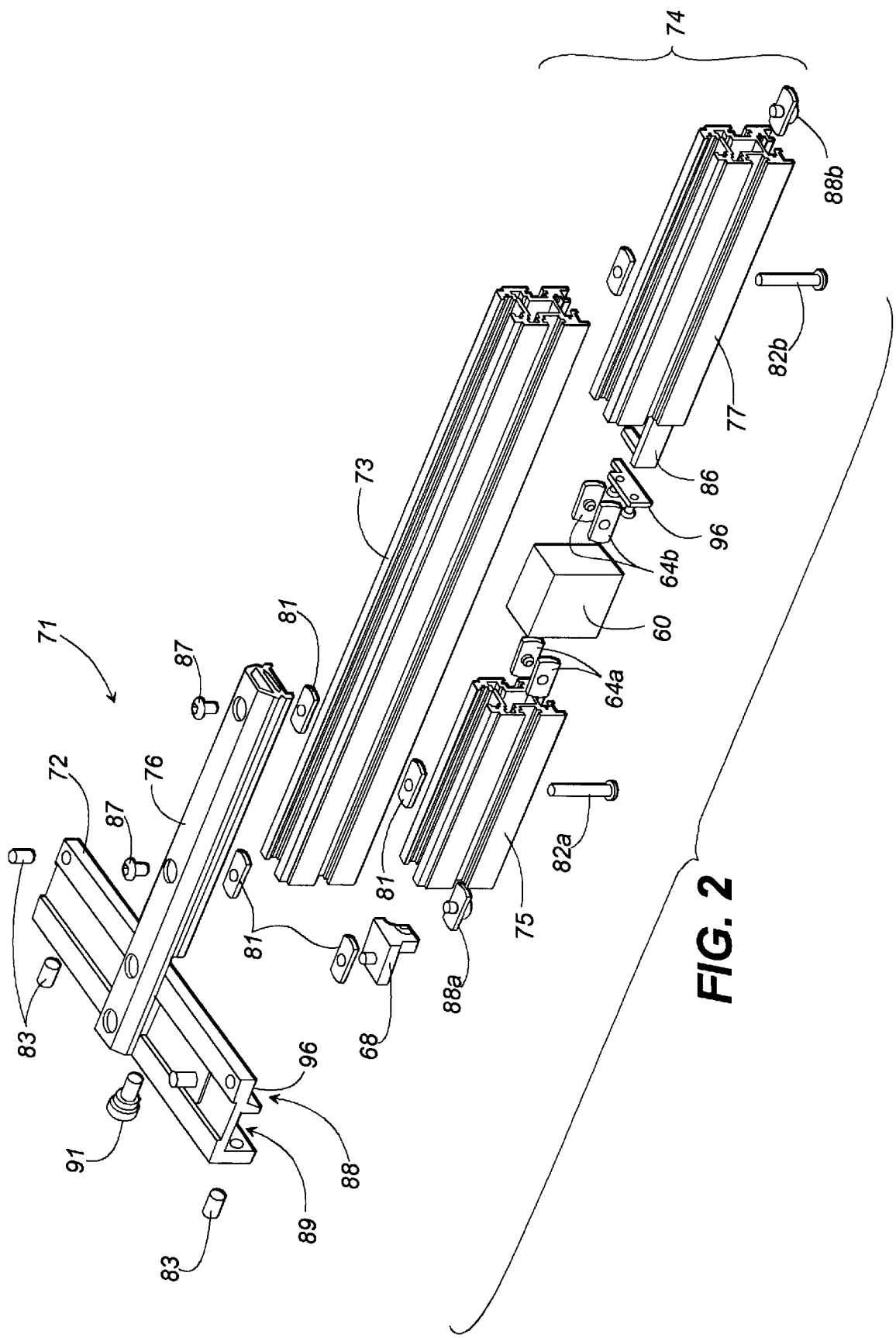
FIG. 2 is an exploded view of the router table sled of the present invention.

The sled 70 is shown in greater detail in the exploded view of FIG. 2. The sled 70 includes a strut assembly 74 comprising a main strut 73, a clamp strut 75, and a lower strut 77, all preferably formed of extruded aluminum or a similar material. The main strut is disposed above the two lower struts. Each strut is generally rectangular in cross-section having four faces, opposed pairs of which are equal in length. A longitudinal T-slot is centered in each of the four faces of each strut. The front faces of each strut lie substantially within the same plane. The main strut 73 is coupled to the clamp strut 75 and lower strut 77 by a plurality of T-nuts 81. The T-nuts 81 slide into a T-slot on the main strut 73 and are secured by a plurality of strut screws 82a, 82b. Strut screws 82a, 82b connect the main strut 73 to clamp strut 75 and lower strut 77 by passing through struts 75, 77 and into nuts 81 located in a lower T-slot of the main strut 73. Each T-nut includes a projection on one face. The projection is oriented away from the exposed face of the main strut T-slot so as not to interfere with the outer portion of the T-slot. An end clamp 68 is coupled to a T-nut that slides along the lower T-slot of the main strut 73. The end clamp engages an end of clamp strut 75.

Clamp strut 75 and lower strut 77 slide along the lower T-slot of the main strut by T-nuts. Brass glide screws 88a, 88b allow the clamp strut 75 and lower strut 77 to glide along the tabletop surface. Opposed ends of the clamp strut 75 and lower strut 77 may be separated a predetermined distance to clear a router bit. To facilitate certain operations, both struts may engage a wooden backup block 60. Two pair of clamp spurs 64a, 64b are aligned within opposing T-slots of each strut 75, 77. Each pair of clamp spurs 64a, 64b includes a group of spaced teeth that grip a portion of backup block 60. Each pair of clamp spurs 64a 64b includes a set screw (not shown) that allows the clamp spur 64 to be securely fastened to a respective strut 75, 77 using a hex key. If no backup block 60 is used, opposed ends of the clamp strut 75 and the lower strut 77 may be abutting.

Lower strut 77 further includes a sliding key 86 and a fixed key 96. The keys may be, for instance, approximately ⅛" in width. The sliding key 86 comprises a slide portion extending approximately 2 inches lengthwise within the lower strut 77 and a metal protrusion extending orthogonally from the strut 77. The sliding key 86 may be moved and removed by turning a sliding key adjustment set screw 99 (see FIGS. 6A and 6B). The fixed key 96 extends from the front of the strut 77 to its rear. The metal protrusion of the fixed key also extends orthogonally from the strut 77 and is parallel to the protrusion of the sliding key 86. Both keys 86, 96 may be used as references during the creation of finger joints, as described in greater detail below.

The arm assembly 71 includes a slide 72 and an arm 76. The main strut 73 slides along a lower projection of the arm 76 by a plurality of T-nuts 81. The arm 76 may be rigidly coupled to the main strut 73 by tightening arm screws 87 into the T-nuts using a hex key. Similarly, the slide 72 moves along an upper face of the fence 50 by a slide groove 89. The arm is rigidly coupled to the fence 50 by a plurality of nylon-tipped set screws 83 that extend into top and rear edges of the slide 72 and contact the fence 50. A low friction tape, such as an ultra-high molecular weight ("UHMW") strip 95, lies across an outer groove 88 of the slide 72.

The sled 70 is adjusted by sliding the slide 72 onto the fence 50. The user adjusts the top set screws 83 until the strut assembly comprising the main strut 73, the clamp strut 75, and the lower strut 77, is perpendicular to the tabletop 21. A square may be used to ensure orthogonality between these pieces. The slide 72 is adjusted by loosening or tightening the two side set screws 83 located on the rear edge of the slide 72. The screws should be adjusted until the sled 70 glides along the fence 50 without lateral play. The sled 70 may be locked in place with a sled locking screw 91.

The sled 70 has several uses including, but not limited to, the following: (1) end routing; (2) end jointing; (3) cross routing; and (4) finger jointing. Each of these activities will now be described in detail.

1. End Routing

FIG. 3 is a perspective view of the sled 70 of the present invention set up for end routing a workpiece 120. The sled 70 is coupled to the router table fence 50, such that the strut assemble is 74 perpendicular to the table fence 50. Preferably, infeed wood sub-fence 54 and outfeed wood sub-fence 56 are attached to the bottom spars 55, 57, respectively, by screws. The strut assembly 74 extends away from the fence 50 to provide a space between the struts and the sub-fence 54. A router shaping bit 32 extends from a bit opening. The counterclockwise rotation of the router bit 32 exerts an opposing force against the workpiece 120. When the workpiece 120 is fed in the direction indicated by the arrow 135, the workpiece 120 will be pushed against the infeed sub-fence 54 and the sled 70. Thus, the sled and the infeed sub-fence 54 provide fixed surfaces for receiving the force of the workpiece 120.

The user preferably loosens the arm screws 87 and retracts the strut assembly 74 from the fence 50 to provide sufficient space for the bit 32 to clear the end clamp 68. The brass glide screws (not shown) should be abutting the tabletop 21. The workpiece 120 is then pressed flush against the strut assembly 74 with the end to be routed placed flush against the infeed sub-fence 54. To ensure that the workpiece 120 does not stray from the cut, it may be clamped to the strut assembly 74. The user then turns on the router and moves the end of the workpiece 120 along infeed and outfeed sub-fences 54, 56 and into the bit 32 in the direction shown by the arrow 135.

2. End Jointing

End jointing removes crosscut saw marks from the end of a workpiece. With each pass, a small amount of material is removed from the workpiece. End jointing is performed similarly to end routing, with the end of the workpiece to be jointed placed flush against the infeed sub-fence 54. The fence 50 is moved to a position where the bit 32 will reduce the edge thickness by a predetermined amount. A jointing shim is placed between outfeed sub-fence 56 and outfeed bottom spar 55. Preferably, the jointing shim has a thickness equal to the amount of material to be removed from the end of the workpiece. The jointing shim ensures that the jointed end surface of the workpiece will be fully supported by the outfeed sub-fence 56. The edge is jointed by moving the workpiece into the bit, as described above with respect to end routing.

3. Cross Routing

A cross rout is made by cutting across the grain of the wood near the middle of the workpiece. FIG. 4 illustrates the set-up for cross-routing using the sled 70 of the present invention. As shown, the fence 50 is moved farther away from the location of the bit 32 than in the end routing set-up. Instead, the sled 70 is set-up to allow the backup block 60 to pass over the bit 32. The strut assembly 74 of the sled 70 remains perpendicular to the orientation of the fence 50, however. A workpiece 120 has an edge that lies flush against the strut assembly 72. The fence 50 is adjusted to leave a gap between the infeed and outfeed bottom spars 57, 55. This gap allows the workpiece 120 to be passed over the bit 32 without contacting the fence spar 57.

Since the counterclockwise rotation of the router bit 32 will have a tendency to kick the workpiece 120 back away from the sled 70, the workpiece 120 should be restrained to the sled struts. A clamp 130 holds the workpiece 120 flush to the strut assembly 74. To restrict the movement of the sled 70, a stop 140 may be placed a fixed distance away from the sled arm 71 along an upper edge of the fence 50. The stop 140 prevents motion of the arm 71 along the fence 50.

The fence 50 may be adjusted to various positions. At each position, the bit will cut into a different portion of the workpiece 120. Once a user has selected the desired cut location, the fence should be locked into position. Power may then be applied to the router. The user then pushes the sled 70 into the rotating bit. The cut will also cut the backup block 60. The backup block 60 prevents tear-out on the back side of the workpiece.

Wider workpieces may also be cross-routed by widening the gap between the infeed and outfeed bottom fence spars 57, 55 and by allowing the fence 50 to move to compensate for the width of the larger piece. When the fence is loosely positioned on the table, two pair of position stops may be attached to the edge of the router table, one at each end of the fence 50 on either side. A paper shim may be placed between the fence 50 and the position stops to set the clearance for the fence to move once the shim is removed. With the infeed side of the sled 70 slightly forward of the opening in the fence 50, the sled 70 should be locked to the fence 50. The fence 50 is then moved forward within the position stops, thereby carrying the sled 70 and the workpiece forward into the bit. It may be necessary to clamp the workpiece to the sled 70.

4. Finger Jointing

The sled 70 of the present invention is particularly useful in creating finger joints. FIG. 5 is an illustration of the sled 70 set up for creating finger joints. Finger joints are performed using a straight router bit 32 of a diameter equal to the size of the desired fingers. The sled 70 is placed on the table with the sliding key 86 and the fixed key 96 protruding in the direction of the bit 32, as shown in the close-up views of FIGS. 6A and 6B. The finger width is adjusted by using the fixed key 96 alone or together with the sliding key 86. To make small finger joints, the sliding key 96 may be removed by inserting a hex key or allen wrench 101 into the sliding key set screw 99. To make larger finger joints, both keys 86, 96 must be used together, as shown in FIG. 6B.

The fence 50 and sled 70 are oriented with the sled 70 riding over the bit 32. Initially, the fence 50 should be adjusted such that the cutting flute of the bit 32 barely touches the fixed key 96. Using a vernier caliper, a micro-adjuster on the fence 50, or a similar measuring device, the fence 50 should be backed away from the bit 32 until the distance between the bit edge and the fixed key 96 is equal to the bit diameter. The fence 50 may then be locked into place.

Figure 7:
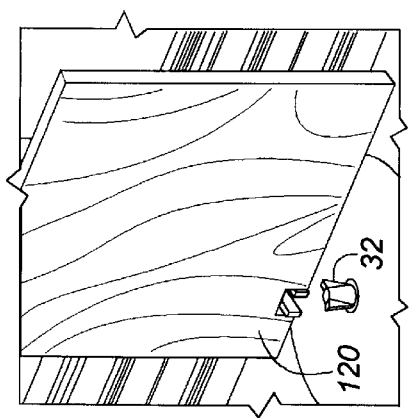
FIG. 7 is an illustration of the sled of the present invention when set up for cutting a second finger joint.

The initial finger joint cut is made in the workpiece 120 as shown in FIG. 5. An edge of the workpiece 120 lies against the fixed key 96. The first finger groove is created by advancing the workpiece 120 into the rotating bit 32. The second cut is created by placing the just-created finger groove over the keys 86, 96 as illustrated in FIG. 7. The workpiece is then advanced into the rotating bit 32 to create the second finger joint. This process is repeated until a series of alternating grooves and fingers have been created in the workpiece.

Figure 8:
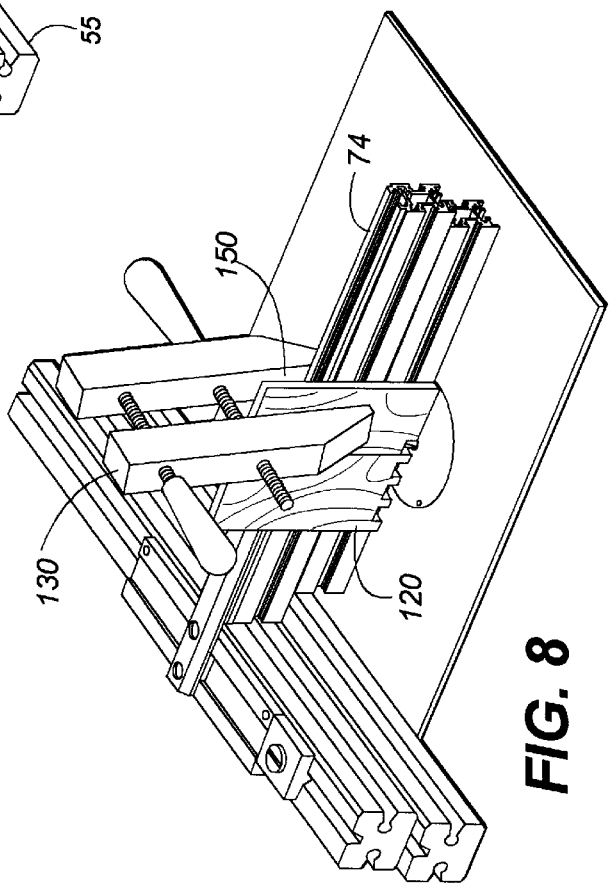
FIG. 8 is an illustration of the sled of the present invention when set up to create a mating set of finger joints.

FIG. 8 is an illustration of the sled 70 of the present invention when set up to create a mating piece to the workpiece 120 described above. The mating piece 150 will have grooves and fingers offset to the grooves and fingers of the first workpiece 120 to allow the pieces to fit snugly together. Initially, the first workpiece 120 is placed against the strut assembly 74 with one groove lying over the keys 86, 96. Next, the workpiece 120 is clamped to the strut assembly 74 using a C clamp 103 or a similar clamping device. Next, the mating piece 150 is placed alongside the first workpiece 120. The mating piece 150 is advanced into the rotating bit to create a first groove. The first groove should lie flush to the edge of the mating piece abutting the first workpiece 120. The first workpiece 120 may then be removed. The mating piece 150 is moved to place the groove over the keys 86, 96. This process is repeated until a series of alternating grooves and fingers have been formed into the mating piece 150.

5. Angular Routing

The design of the sled 70 may be modified to allow the strut assembly 74 to pivot at least 90°. More particularly, the arm 76 may be divided between the screw coupling the arm 76 to the slide 72 and the screw coupling the arm 76 to the main strut 73. This procedure creates two separate arm members. The arm member coupled to the main strut may pivot with respect to the first arm member. A locking device may be used to lock the arm members at a predetermined angle. This set-up facilitates the angular routing of workpieces and the edge routing of mitered workpieces.

Figure 9:
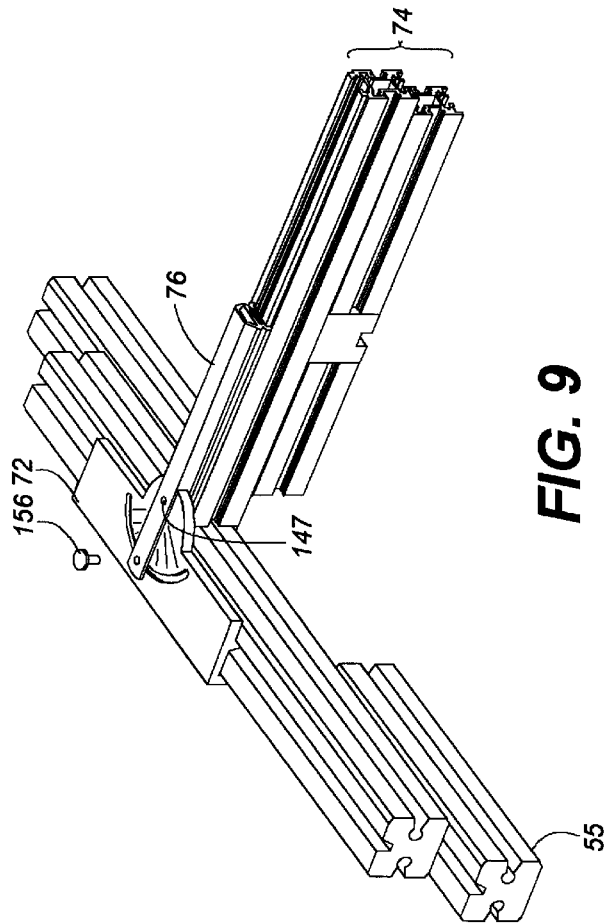
FIG. 9 is an illustration of an alternative embodiment of the sled of the present invention.

Alternatively, a set screw coupling the arm 76 to the slide 72 may be replaced with a pivot pin 147, as shown in FIG. 9. When the locking knob 156 is released, the arm 76 and the strut assembly 74 pivot about the slide 72 toward the infeed spar 57 or the outfeed spar 55. To determine the angular rotation, a protractor 150 or similar angle-measuring device may be located along the top of the slide 72 or along the arm 76. The arm 76 is coupled to the protractor 150 by a pivot pin 147. The protractor 150 includes a plurality of graduations formed at various angles. When the arm 76 has been rotated to the desired angle, the locking knob 156 may be re-tightened, thus locking the arm 76 in place.

Having thus described a preferred embodiment of a router table sled, it should be apparent to those skilled in the art that certain advantages have been achieved. It should also be appreciated that various modifications, adaptations, and alternative embodiments thereof, including the use of the sled in creating mortises and tenons, for example, may be made within the scope and spirit of the present invention. The invention is further defined by the following claims:

What is claimed is:

1. A router table sled for use with a router table fence and a router table top, the sled comprising:
   a slide for slidably engaging the router table fence;
   an arm rigidly coupled to the slide; and
   a strut assembly for adjustably engaging the arm.

2. The router table sled, as recited in claim 1, wherein the strut assembly further comprises:
   a main strut that engages the lower edge of the arm;
   a clamp strut engaging the main strut; and
   a lower strut engaging the main strut.

3. The router table sled, as recited in claim 2, wherein front faces of the main strut, the clamp strut, and the lower strut are in substantially the same plane.

4. The router table sled, as recited in claim 2, wherein opposed ends of the clamp strut and the lower strut may be positioned abutting or separated by a selected distance.

5. The router table sled, as recited in claim 2, further comprising a backup block disposed between opposed ends of the clamp strut and the lower strut.

6. The router table sled, as recited in claim 5, further comprising:
   coupled to the clamp strut, a clamp spur having teeth that engage the backup block.

7. The router table sled, as recited in claim 2, further comprising a fixed key protruding orthogonally from the lower strut.

8. The router table sled, as recited in claim 7, further comprising a sliding key parallel to the fixed key and positionable along a length of the lower strut.

9. The router table sled, as recited in claim 2, further comprising means for engaging the clamp strut and the lower strut with the main strut so that the clamp strut and the lower strut may slide longitudinally relative to the main strut while maintaining vertical alignment relative to each other.

10. The router table sled, as recited in claim 2, wherein each of the main strut front and top faces and the clamp strut front and top faces, and the lower strut front and top faces have a longitudinal T-slot therein.

11. The router table sled, as recited in claim 2, wherein the lower clamp and the clamp strut are oriented with respect to the main strut so that a workpiece may have a first surface abutting the clamp strut and a second surface abutting the fence.

12. The router table sled, as recited in claim 11, wherein the second surface of the workpiece lies in a plane substantially parallel to at least one cutting edge of a router bit extending from an opening in the table top.

13. The router table sled, as recited in claim 2, wherein the lower clamp and the clamp strut are oriented with respect to the main strut so that a workpiece may have a surface abutting the clamp strut and may be guided across a router bit extending from an opening in the table top.

14. The router table sled, as recited in claim 2, further comprising means for holding a workpiece flush with the clamp strut.

15. The router table sled, as recited in claim 1, wherein the slide is disposed above a bit opening in the table top.

16. The router table sled, as recited in claim 2, wherein the main strut is disposed above a bit opening in the table top.

17. A router table sled for use with a router table fence and a router table top, the sled comprising:
   an arm assembly slidably engaging an upper edge of the fence;
   a main strut coupled to the arm assembly;
   a clamp strut coupled to the main strut; and
   a lower strut coupled to the main strut, each of the main strut, clamp strut, and lower strut having a top face, a bottom face, a front face, and a rear face, each face having a laterally centered, longitudinal T-shaped slot therein.

18. The router table sled, as recited in claim 17, wherein the front faces of the main strut, the clamp strut, and the lower strut lie in substantially the same plane.

19. A method for creating a plurality of fingers in a workpiece on a router table, a fence being fixed to the router table, and a router-operated router bit protruding from an opening in the table, the method comprising the steps of:
   providing a sled having a strut assembly, an arm sliding along the fence; a fixed key coupled to the strut assembly, and a sliding key adjacent the fixed key;
   placing a face of the workpiece against the strut assembly and an edge of the workpiece against the fixed key;
   sliding the sled and the workpiece over the router bit to create a first finger opening in the workpiece;
   placing the first finger opening of the workpiece over the fixed key; and
   sliding the sled and the workpiece over the router bit to create a second finger opening in the workpiece.

20. The method for creating a plurality of finger joints, as recited in claim 19, wherein the step of placing the first finger opening of the workpiece over the fixed key further comprises the step of placing the first finger opening of the workpiece over the sliding key.

21. A router table sled for use with a router table fence and a router table top, the sled comprising:
   a slide for slidably engaging the router table fence;
   a first arm rigidly coupled to the slide;
   a second arm rotatably coupled to the first arm; and
   a strut assembly for adjustably engaging the second arm.

22. The router table sled, as recited in claim 21, wherein the second arm rotates at least 90 degrees with respect to the first arm.

23. A router table sled for use with a router table fence and a router table top, the sled comprising:

a slide for slidably engaging the router table fence;

an arm rotatably coupled to the first arm; and a strut assembly for adjustably engaging the second arm.

24. The router table sled, as recited in claim 23, further comprising a releasable locking pin rotatably coupling the arm to the slide.

25. The router table sled, as recited in claim 24, wherein the locking pin may be placed in a released position to permit rotation of the second arm to a desired angle with respect to the slide, and a locked position to lock the arm at the desired angle with respect to the slide.

26. The router table sled, as recited in claim 25, further comprising a protractor mounted atop the slide, the protractor indicating the desired angle between the second arm and the slide.

* * * * *